United States Patent [19]

Matthews et al.

[11] 3,935,825

[45] Feb. 3, 1976

[54] COAL ASH AGGLOMERATION DEVICE

[75] Inventors: Charles W. Matthews, Pittsburgh, Pa.; Jitendra G. Patel, Bolingbrook, Ill.

[73] Assignee: Institute of Gas Technology, Chicago, Ill.

[22] Filed: Feb. 24, 1975

[21] Appl. No.: 552,157

[52] U.S. Cl.................. 110/165 R; 48/63; 48/206; 423/659
[51] Int. Cl.².............................................. F23J 1/00
[58] Field of Search .......... 48/63, 64, 76, 202, 206; 201/9, 14, 15, 28, 29, 31; 423/659; 110/165 R, 165 A, 28 J

[56] References Cited
UNITED STATES PATENTS

| | | | |
|---|---|---|---|
| 2,582,711 | 1/1952 | Nelson.................................. | 201/31 |
| 2,906,608 | 9/1959 | Jequier et al. ........................ | 48/206 |
| 3,218,998 | 11/1965 | Fairman et al....................... | 110/165 |
| 3,772,999 | 11/1973 | Miller, Jr. et al..................... | 110/28 |
| 3,805,713 | 4/1974 | Notary et al......................... | 110/165 |
| 3,840,345 | 10/1974 | André................................... | 110/28 |
| 3,867,110 | 2/1975 | Schora et al.......................... | 201/31 |

*Primary Examiner*—Kenneth W. Sprague
*Attorney, Agent, or Firm*—Molinare, Allegretti, Newitt & Witcoff

[57] ABSTRACT

An improved apparatus for withdrawing agglomerated solids from a fluidizing chamber housing a main, fluidized bed of finely divided solids which comprises at least one withdrawal chamber having a width less than the fluidizing chamber and positioned below the fluidized bed. This withdrawal chamber has sufficient dimensions (width (or diameter when cylindrical) and depth) to contain a second fluidized or semi-fixed bed within said chamber when a high velocity gas stream is introduced into the bottom portion of the withdrawal chamber. This high velocity gas stream forms an inverted cone in the withdrawal chamber, wherein the walls of the cone are defined by the fluidized or semi-fixed bed within the withdrawal chamber. The velocity of the gas stream is adjusted to selectively remove high density agglomerates downward from the main fluidized bed without removing the fluidized solids in admixture therewith. This apparatus is particularly suited for withdrawing agglomerated ash particles from the fluidized bed of a coal gasification reactor.

11 Claims, 5 Drawing Figures

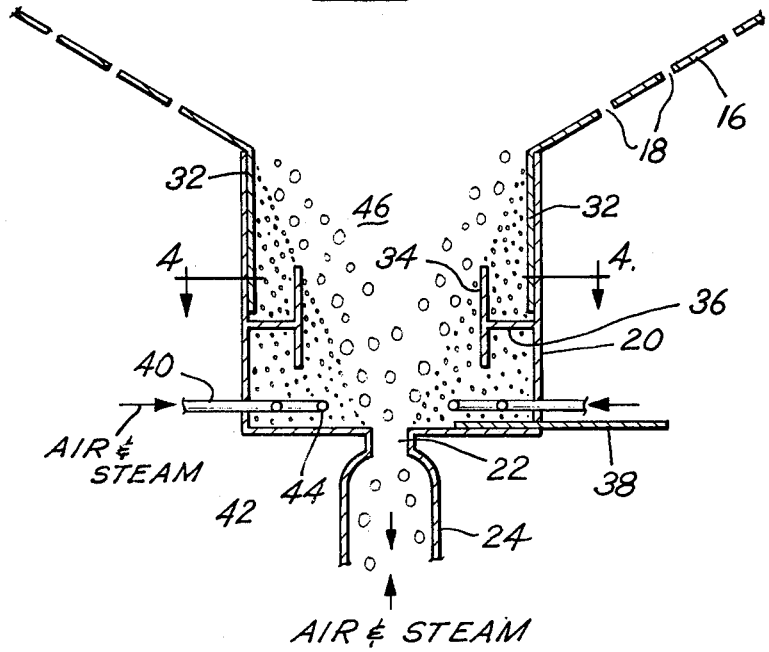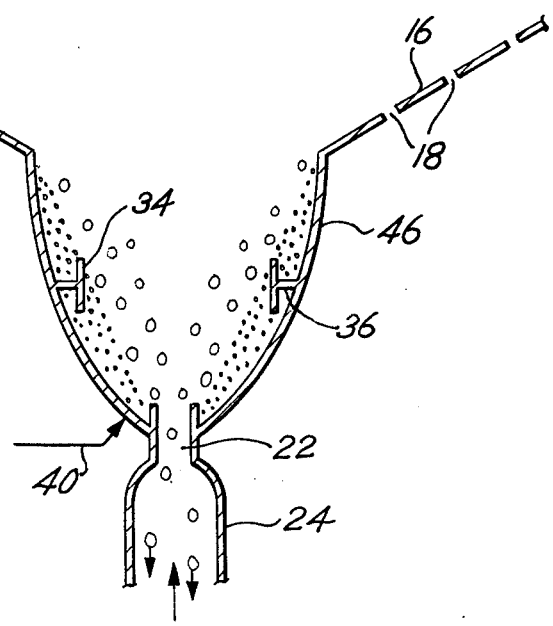

COAL ASH AGGLOMERATION DEVICE

BACKGROUND OF THE INVENTION

This invention relates to the withdrawal of agglomerated solids from a fluid bed of finely divided solids. In particular, this process relates to a coal gasification reactor wherein agglomerated coal ash is withdrawn from a fluid reaction bed of finely divided coal without removal of the finely divided coal particles from the fluid reaction bed.

One of the main sources of atmospheric pollutants today are derived from the combustion of coal in coal fired electric utility boilers. In these installations, a clean fossil fuel such as natural gs is gas a practical substitute for coal in the generation of electricity because of its current scarcity and relatively high cost. Furthermore, the available supply of clean fuel combats pollution more effectively when it is used to provide residential and small commercial needs.

By way of example, the combustion products of coal contribute one-eighth of the total atmospheric pollutants emitted in the United States including one-half of the sulphur oxides and one-fourth of both the nitrogen oxides and particulate matter. Sulphur emissions from coal combustion may be reduced by several methods. These methods include using low sulphur coal; cleaning high sulphur coal by physical methods to remove the sulphur from the coal; removing sulphur from the coal during the combustion thereof; producing a de-ashed low sulphur solid fuel by the solvent processing of coal; and, lastly, gasifying coal and removing the sulphur from the resultant gas prior to combustion of the gasified coal products.

The last method, coal gasification with cleaning of the resultant gas products prior to combustion, appears to offer the greatest reduction in sulphur emissions since most of the sulphur present in the gasified coal appears as hydrogen sulphide. The removal of this hydrogen sulphide, however, from the gasified coal, presents no great problem since several different commercial gas cleaning processes are available today which can reduce the hydrogen sulphide content of a gaseous stream, such as produced in a coal gasification reaction, to less than 10 ppm. In fact, some processes can produce gaseous streams containing hydrogen sulphide of 1 ppm. or less.

A preferred method of gasifying coal is high temperature treatment with air and steam when the coal is finely divided and suspended in a fluid bed. For example, fluid bed reactors for the gasification of coal are illustrated in U.S. Pat. Nos. 2,805,189 and 2,582,712.

In the gasification of coal it is preferred that the gasification of coal it is preferred that the gasification reaction be conducted at high temperatures since this maximizes the production of carbon monoxide and hydrogen which are valuable gaseous fuels. Preferred gasification temperatures are in the range of 1500° to 2000°F and preferably 1600° to 1900°F. Lower temperatures are not desirable since this leads to the production of high amounts of carbon dioxide and water. However, one of the problems encountered in the high temperature gasification of coal is the fusion of ash particles at the high temperatures encountered in the gasification reaction. These high temperatures cause the ash particles to become sticky and agglomerate within the reaction zone. Accordingly, although temperatures in excess of 1700°F are desirable for coal gasification, it is difficult to substantially exceed 1900°F since temperatures in excess of 2000°F lead to the formation of sticky ash particles that can agglomerate to form large ash particles that are difficult to remove from the fluid bed.

One method of removing ash particles from a fluid bed reactor is illustrated in Jequier et al. U.S. Pat. No. 2,906,608, the teachings of which are incorporated by reference herein. In the Jequier apparatus, an inverted conical withdrawal section is positioned in the bottom of the fluid bed reactor. A high velocity air-steam stream is passed up through this inverted conical section and reacts with coal therein to create locally higher temperatures within the confined cone positioned at the bottom of the reactor. Within this inverted cone the ash particles are heated to temperature sufficient to render them sticky whereby they gradually agglomerate and become larger in mass and size. When they reach a predetermined value, size and/or weight, the velocity of the gas stream rising up through the cone becomes insufficient to keep these agglomerated particles in the fluid bed and the particles descend down through the narrow bottom portion of the inverted cone and are withdrawn from the fluid bed reaction zone in an efficient manner. Because the velocity of the gaseous material passing up through the cone always exceeds the settling velocity of the finely divided coal particles in the fluid bed per se, the agglomerated ash particles can be selectively removed without removal of the coal particles from the fluidized bed proper.

A problem associated with the Jequier et al. apparatus is that extremely high temperatures are present in the conical withdrawal section. For example, the temperatures within the conical withdrawal zone are at least 100° and often 200° higher than the temperatures encountered in the fluid bed proper. Since the abrasive agglomerated ash particles are in constant physical contact with the walls of the cone and because of the high temperatures present therein, exotic expensive alloys are required to manufacture a long lasting withdrawal cone.

SUMMARY OF THE INVENTION

It is an object of this invention to provide an improved apparatus and method for withdrawing agglomerated particles from a fluid bed of finely divided particles.

It is another object of this invention to provide an improved apparatus and method for withdrawing agglomerated ash particles from a high temperature fluid bed coal gasification reaction zone.

It is a specific object of the present invention to provide an apparatus and method for withdrawing agglomerated ash particles from a fluid bed coal gasification reaction wherein the withdrawal apparatus is not subjected to appreciable abrasion and is not exposed to temperatures substantially higher than the temperatures present in the fluid bed proper so that the withdrawal apparatus can be constructed of conventional materials of construction.

In a broad embodiment, the present invention relates to an improvement in an apparatus for contacting a mass of fluidized solids with a gaseous medium and withdrawing agglomerated solids from the mass of fluidized solids wherein the apparatus includes a fluidizing chamber, a grate positioned near the bottom of the fluidizing chamber to support said fluid bed and means for passing a gaseous medium upward through said grate to assist in maintaining the solids in a fluidized state. The particular improvement of the present invention allows for the withdrawal of agglomerated solids from the mass of fluidized solids within the fluidizing chamber and comprises at least one withdrawal chamber having a width (or diameter when the chamber is cylindrical) less than the width of the fluidizing chamber positioned below said fluid bed and grate. For small diameter fluidizing chambers, only one withdrawal chamber is required. For larger diameter fluidizing chambers, two or more are required for efficient operation. The withdrawal chamber is open at the top for communication with solids passing down from the fluidized bed and has means for introducing a high velocity fluidizing gaseous medium to the bottom portion of the withdrawal chamber included therewith. An important aspect of the present invention is that the withdrawal chamber have dimensions sufficient to contain a fluidized bed or semi-fixed bed within said withdrawal chamber when the high velocity gaseous medium passes therethrough. Preferably, this fluidized or semi-fixed bed has a bed density greater than the density of the superimposed fluidized bed. For example, in a coal gasification reaction, the reaction bed had a density of about 15–30 lb./ft.$^3$ whereas the fluidized or semi-fixed bed has a density of about 40–60 lb./ft$^3$. In operation the high velocity gaseous stream enters the withdrawal chamber preferably in the center thereof, to provide a inverted conical shaped gaseous flow pattern through the fluidized or semi-fixed bed contained within the withdrawal chamber. In other words, there is a line of demarcation between the flow pattern through the withdrawal chamber and the fluidized or semi-fixed bed contained therein. Thus, the "walls" of the inverted cone are provided by the solids bed within the withdrawal chamber. Preferably this solids bed is of sufficient size to prevent the walls of the withdrawal chamber from being subjected to high temperatures that may be present in the high velocity inverted conical flow pattern and protects the walls from the scouring action of higher velocity solid materials.

In a particularly preferred embodiment, the shape of the fluid bed is maintained and sloughing of the surface between the high speed inverted concial flow pattern and the fluidized bed within the withdrawal chamber is prevented by a baffle positioned within the chamber and having its walls parallel to the overall flow path of the high velocity gas through the inverted conical flow pattern. When the withdrawal chamber is cylindrical, the baffle is concentrically positioned within the chamber and the high speed gas enters the center of the chamber. Preferably, the apparatus includes means for introducing a low velocity gaseous stream at the bottom of the withdrawal chamber at a point laterally removed from the point of introduction of the high velocity gaseous stream. This stream helps maintain the bed within the withdrawal chamber in a fluidized or semi-fixed state.

Another embodiment of this invention relates to a process for withdrawing agglomerated solids such as coal ash from the bottom of a fluidized bed of finely divided solids such as a high temperature fluidized bed gasification reactor. This process includes introducing a first high velocity gas stream upwardly through a vessel containing a bed of fluidized solids through at least one withdrawal chamber. This withdrawal chamber is open at the top and is positioned below the bed of fluidized solids. Finely divided solids from the fluidized bed are permitted to flow downward therefrom into the chamber around the perimeter thereof. These solids are maintained in a fluidized or semi-fixed bed within the chamber while a high velocity gas stream is passed upward from the bottom of the withdrawal chamber. This gas stream forms a vertical conical zone within the withdrawal chamber wherein the walls of the cone are defined by the adjacent bed of solids. The velocity of this high velocity gas stream is adjusted to permit the selective removal of agglomerated solids from the fluid bed within the superimposed vessel without the removal of finely divided solids therefrom.

The apparatus of the present invention, as set forth above, has the advantage of not exposing the withdrawal chamber to temperatures substantially greater than present in the superimposed fluidized bed and the walls of the withdrawal chamber are not subjected to considerable abrasive action.

Although the apparatus and process of the present invention are particularly suited for withdrawing agglomerated solids from the fluid bed of a high temperature coal gasification reaction, it can also be used for agglomerating iron particles from a fluidized bed iron oxide reduction zone, the withdrawal of clinkers from a dense phase fluidization zone for the manufacture of cement or other similar processes whereby agglomerated or higher mass particles must be separated from more finely divided, less massive particles in a fluidized bed.

Other objects and embodiments in a more detailed description of the present invention will become apparent by reference to the following discussion which describes the drawings attached to the present specification.

BRIEF DESCRIPTION OF THE DRAWINGS

FIG. 3 is an enlarged cross-sectional side view of the withdrawal chamber illustrated in FIG. 1.

FIG. 4 is a top cross-sectional view of the withdrawal chamber illustrated in FIG. 3 taken along sectional line 4—4.

FIG. 5 is a detailed cross-sectional view of an alternate configuration for a withdrawal chamber.

DESCRIPTION OF PREFERRED EMBODIMENTS

Figure 1:
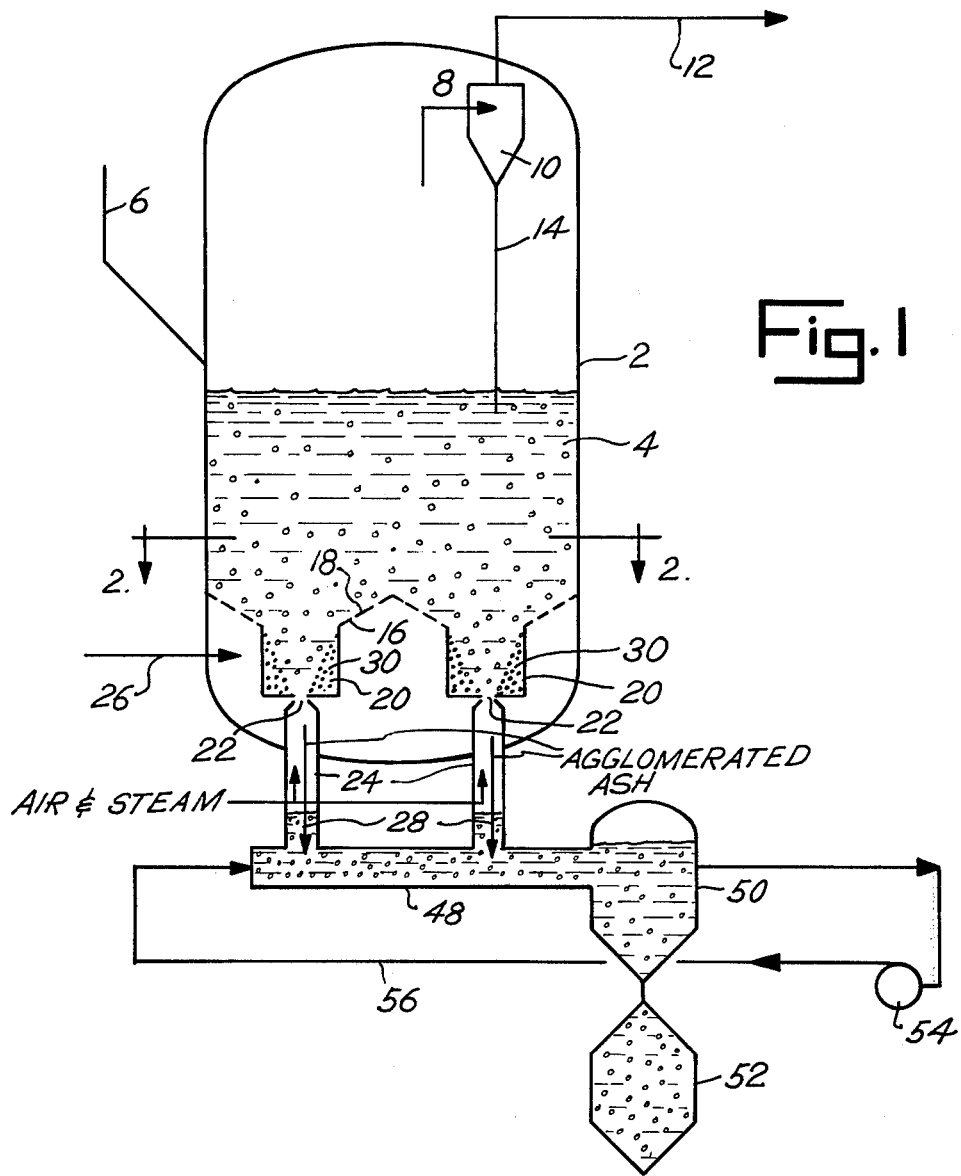
FIG. 1 is a side cross-sectional view of a conventional reactor for the gasification of a fluid bed of coal particles having disposed in the bottom portion thereof the withdrawal chambers of the present invention.
Figure 2:
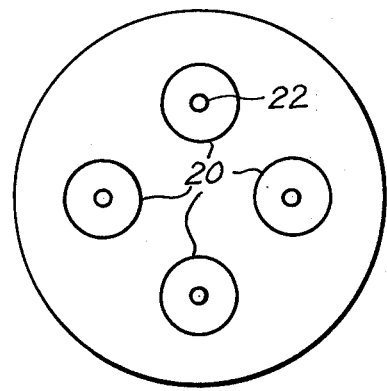
FIG. 2 is a cross-sectional view taken along section line 2—2 of FIG. 1 illustrating the position of the withdrawal chambers beneath the main fluidized bed.

Referring to FIG. 1, there is illustrated a conventional fluidized bed coal gasification reactor 2 having positioned in the bottom portion thereof the withdrawal chambers 20 according to the present invention. Briefly, pulverized fresh feed coal enters via line 6 and is contained within the bottom portion of reactor 2 as a fluid bed 4 having a bed density of about 15–30 lb./ft.$^3$ wherein the coal is converted by reaction with steam and air to gaseous fuel components. These gaseous fuel components pass from the top portion 8 of reactor 2 and enter cyclone 10 for the removal of finely divided coal or dust particles from the gaseous stream. These finely divided coal particles are returned to fluidized bed 4 via line 14 for conversion of the carbon value therein to additional gaseous fuel components.

The raw gaseous reaction products are removed from cyclone 10 via line 12 for further processing by means well known to those trained in the art.

Grid 16, having openings 18 therein, is positioned within the bottom portion of reactor 2. Air and steam entering via line 26 pass upward through openings 18 and help to maintain bed 4 in a fluidized state by passing upwardly therethrough. The ash contained in the feed coal passed to fluid bed 4 generally settles near the bottom of the fluid bed due to its larger density. These ash particles flow down grid 16 and pass into withdrawal chamber 20 wherein they are contacted with a high velocity air-steam stream with a velocity of about 10 – 100 ft./sec. entering the center of chamber 20 through venturi 22. These ash particles are admixed with considerable amount of finely divided coal particles and form a fluid or semifixed bed 30 within withdrawal chamber 20 having a density of about 40 – 60 lb./ft.$^3$. Bed 50 within withdrawal chamber 20 protects the sides of the chamber from the abrasions effects created by the high velocity stream entering through venturi 22 and protects the walls from localized high temperatures within inverted cone 46 within withdrawal chamber 20. More particularly, the air-steam stream entering via line 20 is adjusted to react with the coal particles that enter withdrawal chamber 20 thereby creating temperatures approximately 100° to 200°F higher than the temperature maintained in fluid bed 4 proper. This air-steam stream represents approximately 20–40% of the total air and steam passed to bed 4, the remainder entering via line 26. Typically the fluid bed has a temperature of about 1800°–1900°F and the temperature in the inverted cone is about 2000°–2100°F. The localized higher temperatures cause the ash particles within cone 46 to become sticky. As a consequence, the ash particles, as they strike each other, gradually agglomerate. When they reach a sufficient size and weight, the velocity of air entering via venturi 22 is insufficient to keep the agglomerated particles in a fluid or suspended state and they pass downwardly through venturi 22 into withdrawal line 24 wherein they are immediately quenched by a water stream circulated by pump 54 through conduit 56 to sluice channel 48. The ash particles form a slurry with the water. The slurry is passed to lock hoppers 50 and 52 for withdrawal from the system and subsequent separation of the ash particles from the quenched water.

The operation of the withdrawal chambers illustrated in FIG. 1 is best illustrated by reference to FIG. 3 which shows in more detail the construction of the withdrawal chamber. Venturi 22 is preferably centered in the middle of a cylindrical chamber 20 having a length to diameter ratio of about 0.25:1 to about 1:1. Since the agglomeration properties of coal differ, so also does the geometry of the inverted cone 46 formed within chamber 20, necessary to efficiently agglomerate the coal particles. Generally speaking, the inverted cone formed has an included angle of about 10° to about 60°. However, this angle can vary depending on the particular coal being processed within the fluid bed 4, but is substantially constant for a given coal. Accordingly, to make reactor 2 sufficiently versatile to receive several different types of feed coal, withdrawal chamber 20 is equipped with an adjustable sleeve 32 concentrically positioned within chamber 20. By moving sleeve 32 up and down, the length to diameter ratio chamber 20, and the resultant angle of cone 46 can be varied to accommodate differing feed coals. Stabilization baffles 34 concentrically positioned within the chamber 20 and attached thereto through braces 36 help maintain a sharp line of demarcation between fluid or semi-fixed bed 30 and inverted high velocity conical section 46. In particular, baffles 34 prevent the surface of the fluid bed from sloughing or suddenly plugging venturi opening 22 in the bottom of chamber 20.

A low velocity air-steam mixture (i.e. less than 5 ft./sec.) entering via line 40 passes to distributor pipes 42 and 44 positioned in the bottom portion of withdrawal chamber 20. The air-steam mixture emanating from these distribution pipes helps to maintain bed 30 within a fluid or semi-fixed state.

In actual operation, a mixture of finely divided coal particles and coal ash flow continuously over the top perimeter of chamber 20 to replenish the coal particles which are gasified within zone 46 or are passed upward to the superimposed reaction bed. Since the ash particles have a density more than the density of the individual coal particles and tend to settle to the bottom of bed 4, the concentration of ash particles within the coal that enters chambers 20 is appreciably higher than the concentration of ash particles within fluid bed 4 proper. The coal and ash particles within fluid or semi-fixed bed 30 are drawn into cone 46 through the action of the high velocity stream entering via line 22. Within cone 46, the carbon value in the coal particle is converted to $CO_2$ and water and the resultant exothermic reaction produces a locally higher temperature within inverted conical zone 46. This locally higher temperature causes the surface of the ash particles to become sticky. Since there is constant contact and interaction between the sticky ash particles contained within the zone 46, larger agglomerated ash particles are formed which eventually reach a size and weight sufficient to allow them to pass downward through venturi 22 counter-current to the flow of the air-steam stream therethrough. This ensures the separation of ash particles from the finely divided coal without removing or losing carbon value from the coal contained within the bed.

Slide valve 38 positioned immediately above venturi 22 allows quick isolation of conduit 24 from withdrawal chamber 20 in case the air and steam flow must be discontinued. This presents a sudden downward flow of finely divided coal particle through conduit 24.

Although withdrawal chamber 20 is depicted in FIG. 1 through 4 as being cylindrical in shape, the chamber is not to be limited to such a configuration. Any configuration is suitable as long as there is sufficient room within chamber 20 to provide for a fluidized or semi-fixed bed within chamber 20 to protect the walls therefrom the effects of the high gas velocity through inverted cone 46 and any locally higher temperatures. For example, chamber 20 can have an elipsoid cross-section as illustrated in FIG. 5. Similarly, the discharge point of venturi 22 can extend above the bottom of chamber 20 irrespective of the geometry of the chamber. The operation of a withdrawal chamber having a semi-elipsoid cross-section as illustrated in FIG. 5 is identical to the operation discussed with relation to the cylindrical withdrawal chambers illustrated in FIGS. 1 through 4. Thus, the apparatus and the process of the present invention are not to be specifically limited to the exact configuration illustrated.

What we claim is:

1. In an apparatus for contacting a mass of fluidized solids with a gaseous medium and withdrawing agglomerated solids from the mass of fluidized solids wherein the apparatus includes a fluidizing chamber, a grate positioned near the bottom of the fluidizing chamber to support said fluid bed and means for passing a gaseous medium through said grate to assist in maintaining the solids in a fluidized state, the improved apparatus for withdrawing agglomerated solids from said mass of fluidized solids which comprises at least one withdrawal chamber having a width less than the width of the fluidizing chamber, positioned below said fluid bed and open at the top to communicate with the fluidizing chamber and, means for introducing a high velocity fluidizing gaseous medium to the bottom portion of said withdrawal chamber, said withdrawal chamber having dimensions sufficient to contain a semi-fixed bed within said chamber, said high velocity gaseous means positioned in said withdrawal chamber to provide a high velocity inverted conical shaped gaseous flow pattern through the semi-fixed bed, the walls of said pattern provided by said semi-fixed bed.

2. An apparatus as in claim 1 which includes a cylindrical baffle positioned within said withdrawal chamber to prevent sloughing of the surface of the semi-fixed bed with said chamber, said baffle positioned above the introduction point of the high velocity gaseous medium, and having walls parallel to the flow of gas through said cone.

3. An apparatus as in claim 1 which includes means for introducing a low velocity gaseous stream to the bottom of said chamber at a point laterally removed from the point of introduction of the high velocity gaseous stream to help maintain the bed in a semi-fixed condition within the withdrawal chamber.

4. An apparatus as in claim 1 wherein the discharge point of said high velocity gaseous introduction means is positioned above the bottom of the withdrawal chamber.

5. An apparatus as in claim 1 wherein said withdrawal chamber comprises a cylindrical chamber having a cylindrical baffle concentrically positioned therein above the introduction point of the high velocity gaseous medium, said gaseous medium discharged in the center of said chamber.

6. An apparatus as in claim 5 wherein the discharge point of said high velocity gaseous introduction means is positioned above the bottom of the withdrawal chamber and said apparatus includes means for introducing a low velocity gaseous stream to the bottom of said chamber at a point laterally removed from the point of introduction of the high velocity gaseous stream to help maintain the bed in semi-fixed condition within the withdrawal chamber.

7. An apparatus as in claim 1 which includes an adjustable sleeve positioned within said chamber and means for adjusting the height of said sleeve thereby adjusting the height of said chamber.

8. An apparatus as in claim 1 which includes means for quickly arresting the flow of gas to said high velocity gaseous introduction means.

9. A process for withdrawing agglomerated solids from the bottom of a fluidized bed of finely divided solids which comprises:

introducing a first high velocity gas stream upwardly into a vessel containing a bed of fluidizable solids through at least one withdrawal chamber, said withdrawal chamber comprising a chamber open at the top and having positioned in the bottom portion thereof an opening to receive said high velocity gas stream said chamber having dimensions sufficient to contain a semi-fixed bed within said chamber;

permitting finely divided solids to flow from the fluid bed into said chamber around the perimeter thereof;

maintaining the finely divided solids as a semi-fixed bed in said chamber, and;

adjusting the velocity of the high velocity gas stream to form an inverted cone within said chamber, the walls of said cone being the walls of the semi-fixed bed, said velocity being adjusted to permit the selective removal of agglomerated solids from said bed without removal of finely divided solids therefrom.

10. A process in claim 7 which includes passing a second low velocity gas stream into said chamber laterally from said first high velocity stream to maintain the solids within said chamber in a semi-fixed state.

11. A process according to claim 1 which includes adjusting the height of the withdrawal chamber by moving a adjustable sleeve positioned within said chamber.

* * * * *